(12) United States Patent
Otsuka

(10) Patent No.: US 10,626,874 B2
(45) Date of Patent: Apr. 21, 2020

(54) FAN APPARATUS

(71) Applicant: NIDEC SERVO CORPORATION, Kiryu-shi, Gunma (JP)

(72) Inventor: Motoi Otsuka, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 0 days.

(21) Appl. No.: 15/756,634

(22) PCT Filed: Aug. 24, 2016

(86) PCT No.: PCT/JP2016/074653
§ 371 (c)(1),
(2) Date: Mar. 1, 2018

(87) PCT Pub. No.: WO2017/098578
PCT Pub. Date: Mar. 9, 2017

(65) Prior Publication Data
US 2018/0258939 A1 Sep. 13, 2018

(30) Foreign Application Priority Data

Sep. 2, 2015 (JP) .................. 2015-172713

(51) Int. Cl.
*H02P 3/12* (2006.01)
*F04D 25/06* (2006.01)
(Continued)

(52) U.S. Cl.
CPC .............. *F04D 25/06* (2013.01); *F04B 17/03* (2013.01); *H02P 3/12* (2013.01); *H02P 3/22* (2013.01)

(58) Field of Classification Search
CPC .... H02P 3/12; H02P 6/182; H02P 3/22; H02P 6/24
See application file for complete search history.

(56) References Cited

U.S. PATENT DOCUMENTS 6,078,156 A  6/2000 Spurr
6,545,886 B1 * 4/2003 Ireland .................. A63H 19/24
                                                     363/132
(Continued)

FOREIGN PATENT DOCUMENTS

JP      06-335273 A    12/1994
JP    2009-213234 A     9/2009
(Continued)

OTHER PUBLICATIONS

Official Communication issued in International Patent Application No. PCT/JP2016/074653, dated Nov. 8, 2016.

*Primary Examiner* — Thai T Dinh
(74) *Attorney, Agent, or Firm* — Keating & Bennett

(57) ABSTRACT

A fan apparatus has a drive circuit for an electrically-driven rotor, and includes a drive signal generating circuit portion for the electrically-driven rotor; an output stage including an upper MOSFET and a lower MOSFET; and a motor portion to be driven by the output stage. One of the upper MOSFET and the lower MOSFET is a braking MOSFET, while another of the upper MOSFET and the lower MOSFET is a non-braking MOSFET. The fan apparatus further includes a back-electromotive force supply portion arranged to supply, to the braking MOSFET, power by a back-electromotive force caused by rotation of the motor portion while a power supply voltage for the electrically-driven rotor is not being supplied; and an electromagnetic brake portion arranged to electromagnetically brake the motor portion by causing the braking MOSFET to enter an ON state through the power supplied by the back-electromotive force supply portion.

4 Claims, 7 Drawing Sheets

(51) Int. Cl.
    *H02P 3/22*     (2006.01)
    *F04B 17/03*     (2006.01)

(56) References Cited

U.S. PATENT DOCUMENTS

| | | | |
|---|---|---|---|
| 6,741,047 B2 * | 5/2004 | Horng | H02P 29/02 318/246 |
| 6,963,183 B1 * | 11/2005 | Kessler | H02H 7/0833 318/434 |
| 7,397,212 B2 * | 7/2008 | Turner | H02P 23/14 318/561 |
| 7,889,977 B2 * | 2/2011 | Strike | H02P 7/29 318/400.21 |
| 8,274,249 B2 * | 9/2012 | Mishima | H02P 29/032 318/400.21 |
| 9,035,583 B2 * | 5/2015 | Cerrato | H02P 7/285 318/268 |
| 9,385,640 B2 * | 7/2016 | Sun | H02P 3/12 |
| 9,513,653 B2 * | 12/2016 | Everson | G05F 3/267 |
| 2004/0227479 A1 | 11/2004 | Youm | |
| 2007/0222290 A1 * | 9/2007 | Matsuhashi | H02P 3/12 303/199 |
| 2009/0134821 A1 | 5/2009 | Ito et al. | |
| 2013/0181639 A1 | 7/2013 | Yamanaka et al. | |

FOREIGN PATENT DOCUMENTS

| | | | |
|---|---|---|---|
| JP | 2009213234 A * | 9/2009 | |
| JP | 2013-188000 A | 9/2013 | |
| WO | 2010/033101 A1 | 3/2010 | |

\* cited by examiner

FAN APPARATUS

BACKGROUND OF THE INVENTION

1. Field of the Invention

The present disclosure relates to a fan apparatus.

2. Description of the Related Art

A technique of braking a rotation of a motor caused by an external force to reduce the rotation rate thereof has been known. For example, a technique described in JP-A 2013-188000 has been known.

However, the technique described in JP-A 2013-188000 requires power to be supplied from an external source to reduce the rotation rate of a motor caused by an external force, and is therefore unable to achieve a reduced power consumption.

An embodiment of the present invention has as an object to reduce the rotation rate of a motor caused by an external force while achieving a reduced power consumption.

SUMMARY OF THE INVENTION

A fan apparatus according to an embodiment of the present disclosure has a drive circuit for an electrically-driven rotor, and includes a drive signal generating circuit portion for the electrically-driven rotor; an output stage including an upper MOSFET and a lower MOSFET; and a motor portion to be driven by the output stage. One of the upper MOSFET and the lower MOSFET is a braking MOSFET, while another of the upper MOSFET and the lower MOSFET is a non-braking MOSFET. The fan apparatus further includes a back-electromotive force supply portion arranged to supply, to the braking MOSFET, power by a back-electromotive force caused by rotation of the motor portion while a power supply voltage for the electrically-driven rotor is not being supplied; and an electromagnetic brake portion arranged to electromagnetically brake the motor portion by causing the braking MOSFET to enter an ON state through the power supplied by the back-electromotive force supply portion.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Hereinafter, a fan apparatus 100 according to an embodiment of the present disclosure will be described with reference to the accompanying drawings. Note that the scope of the present disclosure is not limited to embodiments described below, but includes any modification thereof within the scope of the technical idea of the present disclosure.

Figure 1:
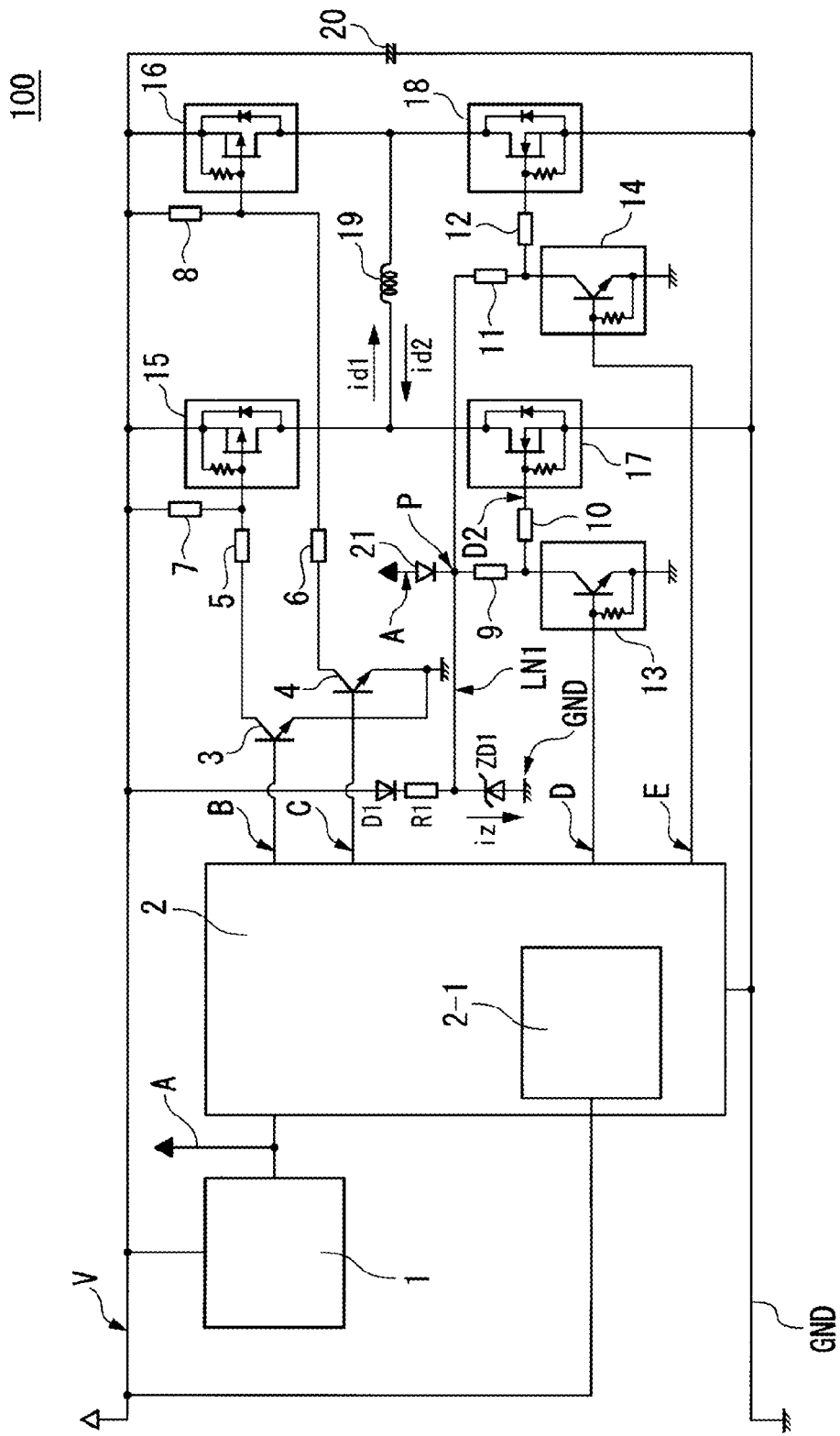
FIG. 1 is a diagram illustrating an embodiment of the present disclosure, and is a circuit diagram illustrating an example circuit configuration of a fan apparatus.

FIG. 1 is a circuit diagram illustrating an example circuit configuration of the fan apparatus 100. The fan apparatus 100 includes a regulator circuit portion 1, a drive signal generating circuit portion 2, transistors 3 and 4, transistors 13 and 14, a motor portion 19, a capacitor 20, a diode 21, and an output stage. The output stage includes upper MOSFETs 15 and 16 and lower MOSFETs 17 and 18. Note that, although the output stage is a single-phase full-bridge circuit in this example, this is not essential to the present disclosure. For example, in the case where the motor portion 19 is a three-phase motor, the output stage may be a three-phase full-bridge circuit.

In the case where a power supply voltage V is supplied, an electric drive current id1 is supplied to the motor portion 19 when each of the upper MOSFET 15 and the lower MOSFET 18 of the output stage is in an ON state, and each of the upper MOSFET 16 and the lower MOSFET 17 of the output stage is in an OFF state. In addition, in the case where the power supply voltage V is supplied, an electric drive current id2 is supplied to the motor portion 19 when each of the upper MOSFET 15 and the lower MOSFET 18 of the output stage is in the OFF state, and each of the upper MOSFET 16 and the lower MOSFET 17 of the output stage is in the ON state. Each of the upper MOSFETs 15 and 16 is a p-channel MOSFET, which is arranged to enter the OFF state when an H (high) level signal is supplied to a gate terminal thereof, and enter the ON state when an L (low) level signal is supplied to the gate terminal thereof. Each of the lower MOSFETs 17 and 18 is an n-channel MOSFET, which is arranged to enter the ON state when an H level signal is supplied to a gate terminal thereof, and enter the OFF state when an L level signal is supplied to the gate terminal thereof. Note that each of the lower MOSFETs 17 and 18 may be hereinafter referred to as a braking MOSFET as appropriate, and each of the upper MOSFETs 15 and 16 may be hereinafter referred to as a non-braking MOSFET as appropriate.

The regulator circuit portion 1 generates a control power supply voltage A for the drive signal generating circuit portion 2 from the power supply voltage V supplied to the fan apparatus 100. The drive signal generating circuit portion 2 generates each of drive signals B, C, D, and E used to drive the output stage on the basis of the control power supply voltage A supplied from the regulator circuit portion 1. The drive signal generating circuit portion 2 includes a power supply voltage monitoring circuit portion 2-1. The power supply voltage monitoring circuit portion 2-1 detects whether the power supply voltage V is being supplied. Specifically, the power supply voltage monitoring circuit portion 2-1 monitors the potential of the power supply voltage V, and, in the event of a lowering of the power supply voltage V, notifies the drive signal generating circuit portion 2 of the lowering. If the power supply voltage monitoring circuit portion 2-1 detects a lowering of the power supply voltage V, the drive signal generating circuit portion 2 stops outputting the drive signals B, C, D, and E. Specifically, if the power supply voltage V is lowered to a specific potential or less, the drive signal generating circuit portion 2 causes each of the drive signals B, C, D, and E to be in a Hi-Z (high-impedance) state.

The transistor 3 drives the upper MOSFET 15. Specifically, the transistor 3 is an NPN transistor. A base terminal of the transistor 3 is connected to the drive signal generating circuit portion 2, a collector terminal of the transistor 3 is connected to a gate terminal of the upper MOSFET 15 through a resistor 5, and an emitter terminal of the transistor 3 is connected to a ground side of the power supply voltage V, i.e., to a ground potential GND. If an H-level drive signal B is supplied from the drive signal generating circuit portion 2 to the base terminal of the transistor 3, the transistor 3 enters an ON state, and shifts the gate terminal of the upper MOSFET 15 to an L level. Meanwhile, if an L-level drive signal B is supplied from the drive signal generating circuit portion 2 to the base terminal of the transistor 3, the transistor 3 enters an OFF state, and shifts the gate terminal of the upper MOSFET 15 to an H level through the power supply voltage V supplied through a resistor 7.

The transistor 4 drives the upper MOSFET 16 in accordance with the drive signal C supplied from the drive signal generating circuit portion 2. The above-described specific example of the transistor 3 can also be applied to the transistor 4, and therefore, an explanation of a specific example of the transistor 4 is omitted.

The transistor 13 drives the lower MOSFET 17 in accordance with the drive signal D supplied from the drive signal generating circuit portion 2. Specifically, the transistor 13 is an NPN digital transistor. A base terminal of the transistor 13 is connected to the drive signal generating circuit portion 2, a collector terminal of the transistor 13 is connected to a gate terminal of the lower MOSFET 17 through a resistor 10, and an emitter terminal of the transistor 13 is connected to the ground potential GND. If an H-level drive signal D is supplied from the drive signal generating circuit portion 2 to the base terminal of the transistor 13, the transistor 13 enters an ON state, and shifts the gate terminal of the lower MOSFET 17 to an L level. Meanwhile, if an L-level drive signal D is supplied from the drive signal generating circuit portion 2 to the base terminal of the transistor 13, the transistor 13 enters an OFF state, and shifts the gate terminal of the lower MOSFET 17 to an H level through the control power supply voltage A supplied through the diode 21 and a resistor 9.

The transistor 14 drives the lower MOSFET 18 in accordance with the drive signal E supplied from the drive signal generating circuit portion 2. The above-described specific example of the transistor 13 can also be applied to the transistor 14, and therefore, an explanation of a specific example of the transistor 14 is omitted.

The capacitor 20 is connected between the power supply voltage V and the ground potential GND to stabilize the power supply voltage V.

The motor portion 19 is arranged to rotate a fan, which is not shown, through the electric drive currents id1 and id2 supplied from the output stage. A back-electromotive force may occur in the motor portion 19 due to an external force, such as an air flow, causing the fan to rotate. An electric current generated by the back-electromotive force in the motor portion 19 flows into the power supply voltage V through the upper MOSFET 15 or 16, i.e., a parasitic diode in a non-braking MOSFET.

Figure 2:
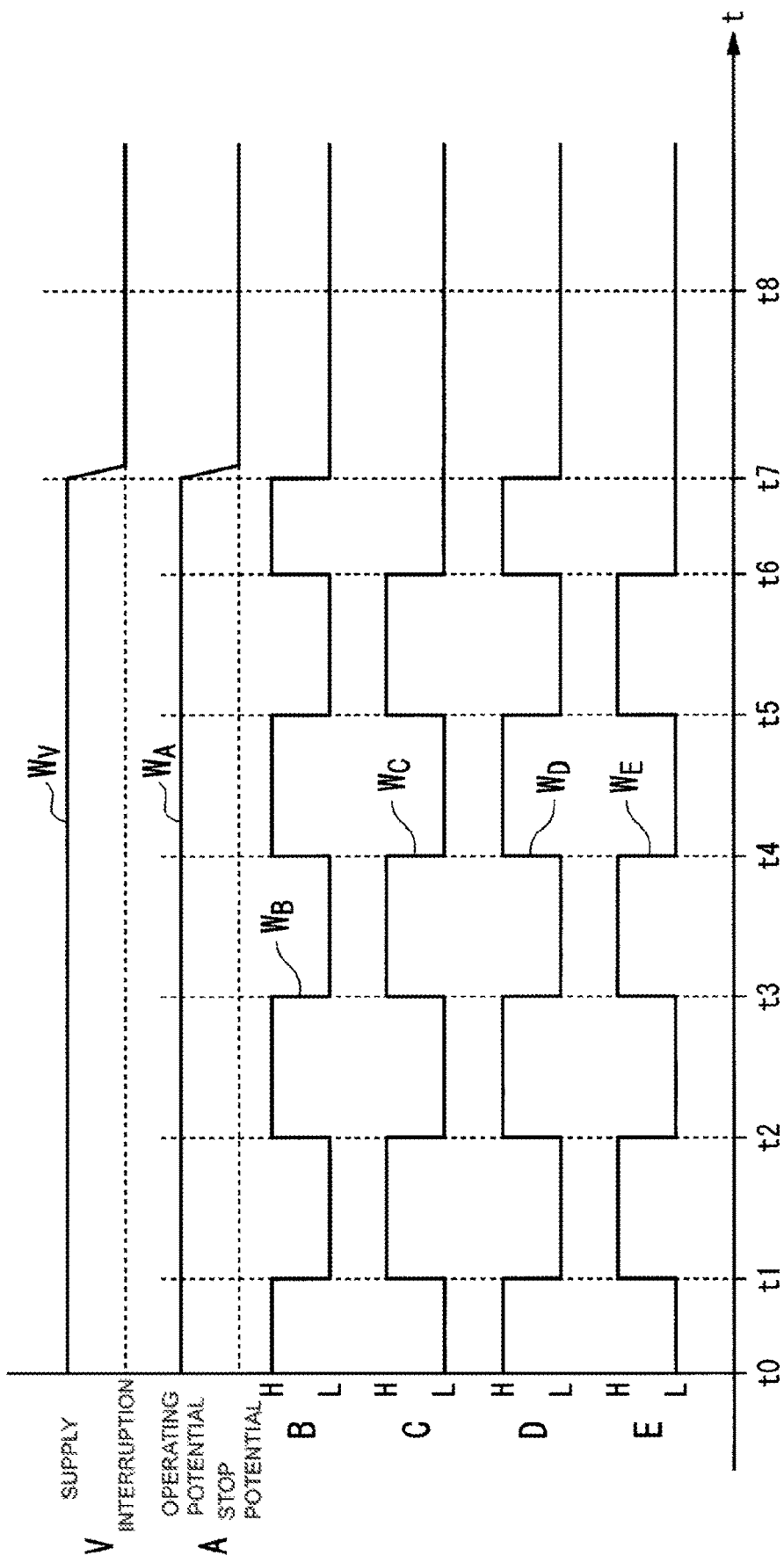
FIG. 2 is a diagram illustrating example waveforms of drive signals generated by a drive signal generating circuit portion.

Next, with reference to FIG. 2, examples of the drive signals generated by the drive signal generating circuit portion 2 will now be described below. FIG. 2 is a diagram illustrating example waveforms of the drive signals generated by the drive signal generating circuit portion 2. In this example, supply of the power supply voltage V continues from time t0 to time t7, and is interrupted at time t7, as indicated by waveform $W_v$ in the figure. The power supply voltage V is, for example, 54 [V]. In accordance with the supply of the power supply voltage V and the interruption thereof, the control power supply voltage A is at an operating potential from time t0 to time t7, and is at a stop potential from time t7 onward, as indicated by waveform WA in the figure. The operating potential of the control power supply voltage A is, for example, 12 [V]. The stop potential of the control power supply voltage A is, for example, 0 [V]. Waveforms $W_B$, $W_C$, $W_D$, and $W_E$ of the drive signals B, C, D, and E, respectively, are shown in the figure. Each of the drive signals B, C, D, and E is switched between an H level and an L level in accordance with control by the drive signal generating circuit portion 2. In this example, when the drive signal B is at the H level, the drive signal C is at the L level, the drive signal D is at the H level, and the drive signal E is at the L level. Meanwhile, when the drive signal B is at the L level, the drive signal C is at the H level, the drive signal D is at the L level, and the drive signal E is at the H level. The drive signal generating circuit portion 2 drives the motor portion 19 by switching the level of each drive signal sequentially from time t0 to time t7.

Referring to FIG. 2, when the supply of the power supply voltage V is interrupted at time t7, the control power supply voltage A shifts from the operating potential to the stop potential. Once the control power supply voltage A shifts to the stop potential, the drive signal generating circuit portion 2 stops outputting the drive signals B, C, D, and E. As a result, each of the drive signals B, C, D, and E is in the Hi-Z state from time t7 onward. Here, details of an operation of the circuitry at time t7 will be described below with reference to FIG. 3.

Figure 3:
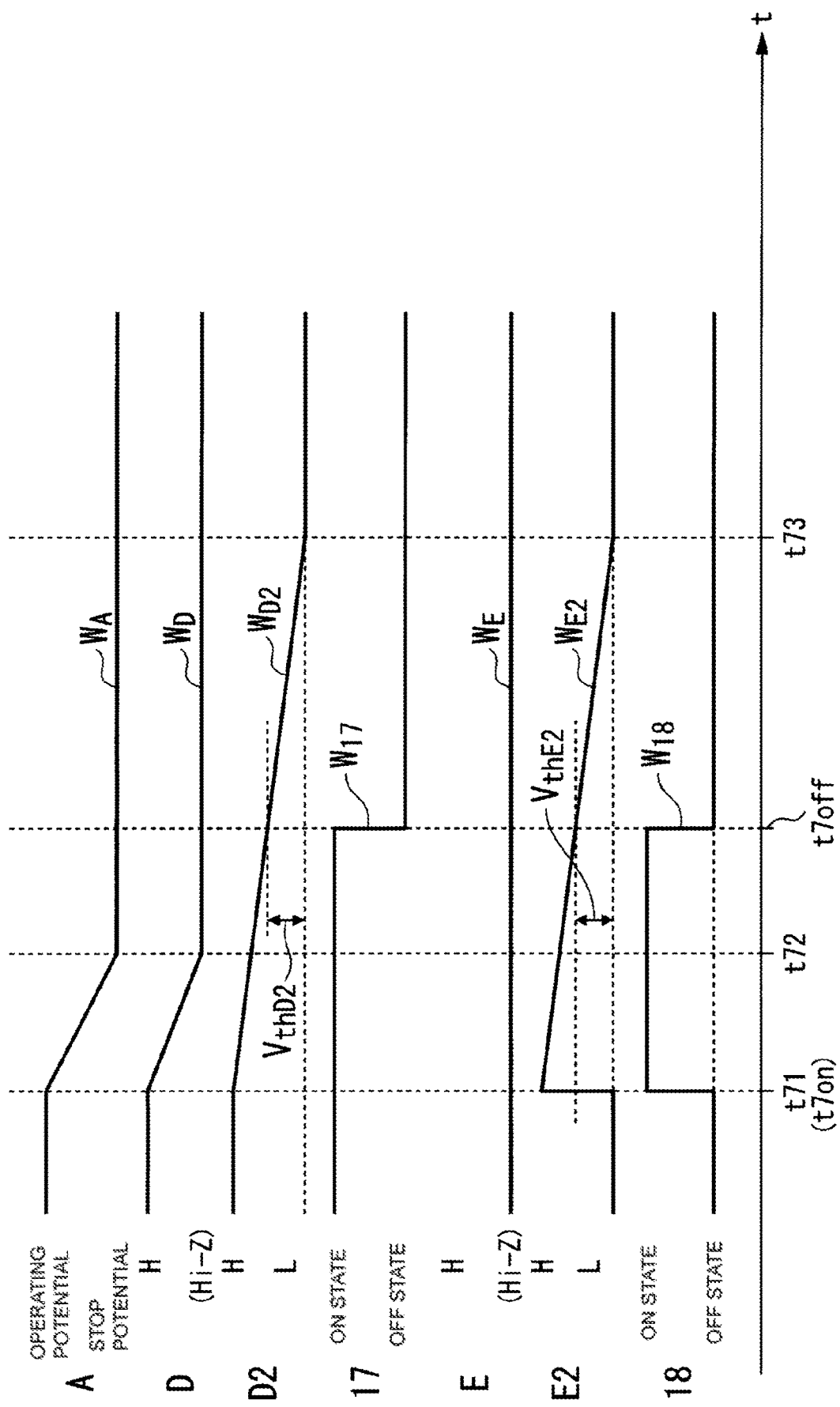
FIG. 3 is a diagram illustrating example signal waveforms when supply of a power supply voltage is interrupted.

FIG. 3 is a diagram illustrating example signal waveforms when the supply of the power supply voltage V is interrupted. If the supply of the power supply voltage V is interrupted at time t71, the control power supply voltage A is lowered from time t71, and reaches the stop potential at time t72. The drive signal D is at the H level at time t71. The drive signal E is at the L level at time t71. After time t71, each of the drive signals D and E is in the Hi-Z state.

In the lower MOSFET 17, a parasitic capacitance exists between the gate terminal and a source terminal thereof. When the drive signal D is in the Hi-Z state, a potential D2 at the gate terminal of the lower MOSFET 17 is maintained at the H level as indicated by waveform WD2 in the figure by an electric charge stored in the parasitic capacitance of the lower MOSFET 17. The lower MOSFET 17 is in the ON state when the potential D2 at the gate terminal exceeds a threshold potential $V_{thD2}$ as indicated by waveform $W_{71}$ in the figure. That is, the lower MOSFET 17 is maintained in the ON state from time t71 to time t7$_{off}$ with the parasitic capacitance between the gate terminal and the source terminal keeping the potential D2 at the gate terminal exceeding the threshold potential $V_{thD2}$.

In the lower MOSFET 18, a parasitic capacitance exists between the gate terminal and a source terminal thereof. When the drive signal E is in the Hi-Z state, a potential E2 at the gate terminal of the lower MOSFET 18 is maintained at the H level as indicated by waveform $W_{E2}$ in the figure by an electric charge stored in the parasitic capacitance of the lower MOSFET 18. That is, similarly to the lower MOSFET 17, the lower MOSFET 18 is maintained in the ON state from time t71 to time t7$_{off}$ with the parasitic capacitance between the gate terminal and the source terminal keeping the potential E2 at the gate terminal exceeding a threshold potential $V_{thE2}$. That is, both the lower MOSFETs 17 and 18 are maintained in the ON state from time t71 to time $t7_{off}$.

The diode 21 prevents the electric charge stored in each parasitic capacitance from flowing into the regulator circuit portion 1 or the drive signal generating circuit portion 2. Accordingly, the gate terminal potentials D2 and E2 do not decrease rapidly, but are maintained for some period. The ON state of the lower MOSFETs 17 and 18 continues until the gate terminal potentials D2 and E2 decrease to the threshold potentials $V_{thD2}$ and $V_{thE2}$ or less, respectively.

In each of the lower MOSFETs 17 and 18, a parasitic diode exists between a drain terminal and the source terminal. An anode of the parasitic diode is arranged on the side of the source terminal connected to the ground potential GND, while a cathode of the parasitic diode is arranged on the side of the drain terminal connected to the motor portion 19. That is, the parasitic diode allows an electric current to flow from the ground potential GND to the motor portion 19. The existence of the parasitic diodes and the ON state of both the lower MOSFETs 17 and 18 combine to cause both ends of a winding of the motor portion 19 to be connected to the ground potential GND. Therefore, according to the fan apparatus 100, the interruption of the supply of the power supply voltage V causes an electromagnetic brake to be applied to the motor portion 19, reducing the rotation rate of the fan.

The braking of the motor portion 19 by the braking MOSFETs at the interruption of the power supply has been described above. Next, braking of the motor portion 19 after the interruption of the power supply will now be described below.

Referring back to FIG. 1, the fan apparatus 100 includes a back-electromotive force supply portion. The back-electromotive force supply portion includes a diode D1, a resistor R1, and a supply line LN1. The diode D1, the resistor R1, and the supply line LN1 are connected in series between the power supply voltage V and the braking MOSFETs. In the example illustrated in FIG. 1, an anode of the diode D1 is connected to the power supply voltage V, while a cathode of the diode D1 is connected to the resistor R1. One end of the resistor R1 is connected to the cathode of the diode D1, while another end of the resistor R1 is connected to a junction point P. The junction point P is connected to the gate terminal of the lower MOSFET 17 through the resistor R9 and the resistor R10. In addition, the junction point P is connected to the gate terminal of the lower MOSFET 18 through a resistor R11 and a resistor R12.

Here, after time t8 in FIG. 2, that is, after the interruption of the power supply, the electric charges in the parasitic capacitances of the braking MOSFETs may decrease to such an extent that the braking MOSFETs cannot be maintained in the ON state by the electric charges in the parasitic capacitances alone. That is, in the fan apparatus 100, the electric charges in the parasitic capacitances of the braking MOSFETs alone may sometimes not suffice to cause the electromagnetic brake to be applied to the motor portion 19 after the interruption of the power supply. A mechanism by which the fan apparatus 100 causes the electromagnetic brake to be applied to the motor portion 19 after the interruption of the power supply will now be described below with reference to FIGS. 4 and 5.

Figure 4:
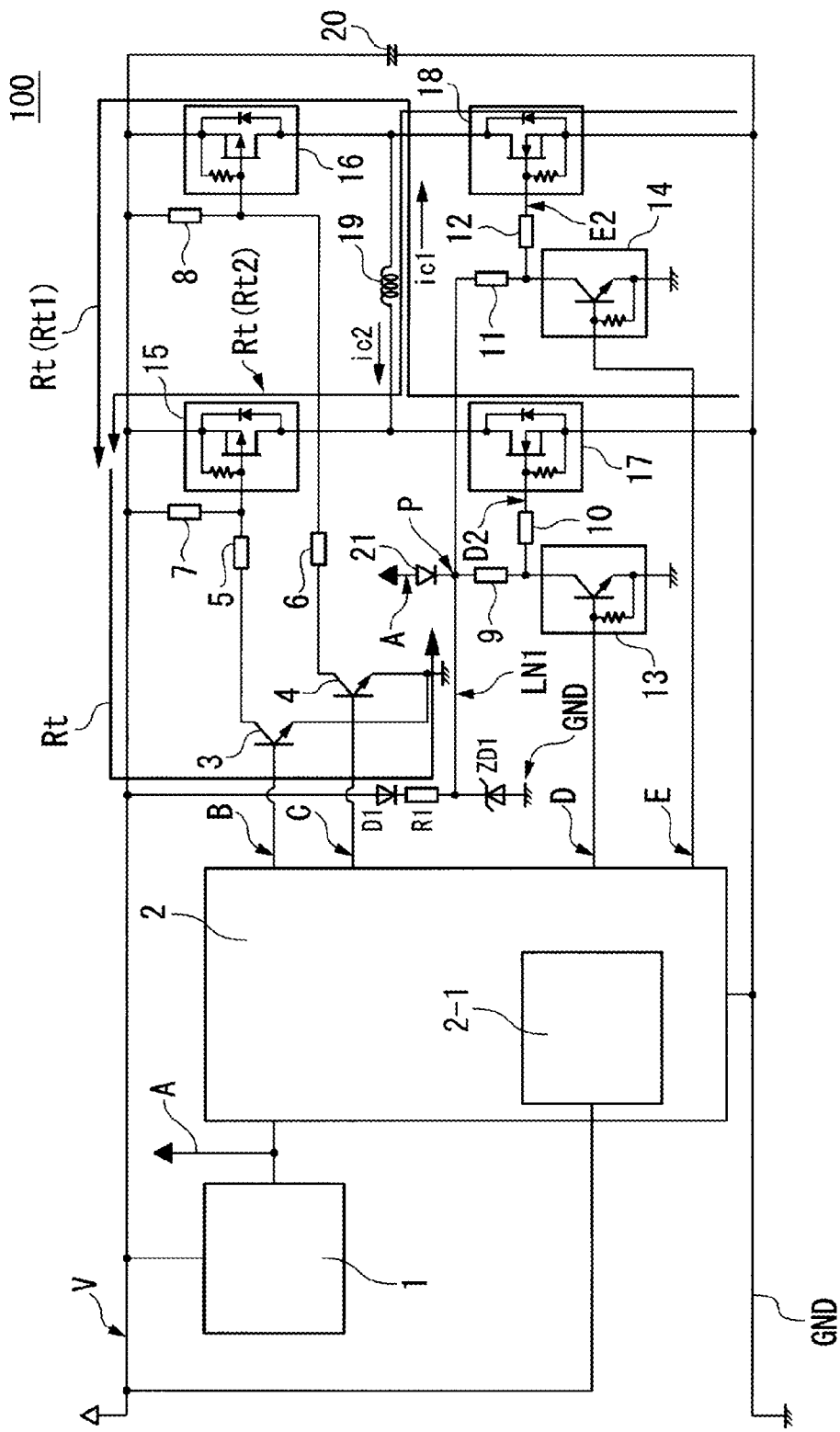
FIG. 4 is a diagram illustrating example back-electromotive force supply paths of the fan apparatus.

FIG. 4 is a diagram illustrating example back-electromotive force supply paths of the fan apparatus 100. As described above, after time t7 in FIG. 2, that is, after the interruption of the power supply, the drive signal generating circuit portion 2 keeps each of the drive signals B, C, D, and E in the Hi-Z state. Therefore, after the interruption of the power supply, each of the upper MOSFETs 15 and 16 and the lower MOSFETs 17 and 18 is in the OFF state. Suppose that an external force causes the fan to rotate at time t8 in FIG. 2. In this case, a back-electromotive force occurs in the motor portion 19 due to the rotation of the fan. This back-electromotive force causes the motor portion 19 to generate an electric current ic1 or an electric current ic2. The electric current ic1 and the electric current ic2 will be hereinafter referred to collectively as an electric current ic unless they need to be differentiated from each other.

As noted above, the parasitic diode exists in each of the upper MOSFETs 15 and 16 and the lower MOSFETs 17 and 18. Even when in the OFF state, each of the upper MOSFETs 15 and 16 and the lower MOSFETs 17 and 18 allows the electric current ic to flow from the side of the ground potential GND to the side of the power supply voltage V through the parasitic diode. The electric current ic1 flows from the ground potential GND into the power supply voltage V through the parasitic diode of the lower MOSFET 17, the motor portion 19, and the parasitic diode of the upper MOSFET 16. That is, the electric current ic1 flows along a back-electromotive force supply path Rt1. Meanwhile, the electric current ic2 flows from the ground potential GND into the power supply voltage V through the parasitic diode of the lower MOSFET 18, the motor portion 19, and the parasitic diode of the upper MOSFET 15. That is, the electric current ic2 flows along a back-electromotive force supply path Rt2.

As noted above, the power supply voltage V and the junction point P are connected to each other through the diode D1 and the resistor R1. The electric current ic which flows into the power supply voltage V through the back-electromotive force supply path Rt1 or the back-electromotive force supply path Rt2 flows into the junction point P through the diode D1 and the resistor R1. That is, the electric current ic flows into the junction point P through a back-electromotive force supply path Rt. With the above arrangement, a potential at the junction point P increases. A change in the potential at the junction point P will now be described below with reference to FIG. 5.

Figure 5:
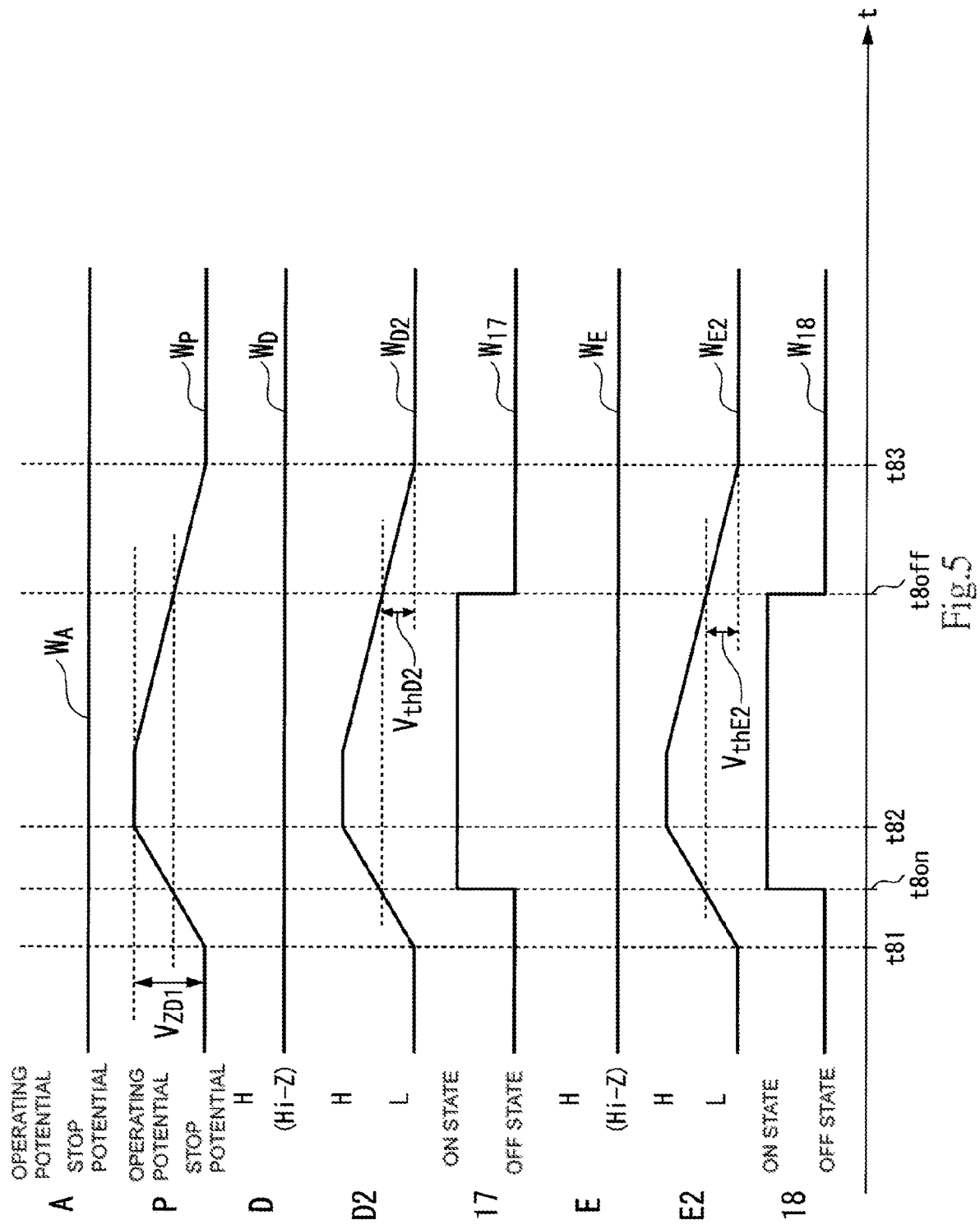
FIG. 5 is a diagram illustrating example waveforms indicative of potential changes caused by a back-electromotive force after an interruption of power supply.

FIG. 5 is a diagram illustrating example waveforms indicative of potential changes caused by the back-electromotive force after the interruption of the power supply. A waveform WA of the control power supply voltage A continues to maintain the stop potential from time t81 to time t84 after the interruption of the power supply. As a result, each of the drive signals D and E is in the Hi-Z state from time t81 to time t84. In this example, the back-electromotive force occurs in the motor portion 19 between time t81 and time t83. The back-electromotive force causes the electric current ic to flow into the junction point P through the back-electromotive force supply path Rt, causing the potential at the junction point P to increase from time t81 to time t82. Between the junction point P and the ground potential GND, a cathode of a constant voltage diode ZD1 is connected to the junction point P, and an anode of the constant voltage diode ZD1 is connected to the ground potential GND. This constant voltage diode ZD1 is, for example, a Zener diode, and restricts the potential at the junction point P to a Zener voltage $V_{ZD1}$ or less. As a result, the potential at the junction point P is maintained at values equal to or lower than the Zener voltage $V_{ZD1}$ from time t82 to time t83.

The potential D2 at the gate terminal of the lower MOSFET 17 varies in accordance with the change in the potential at the junction point P. Once the potential D2 at the gate terminal exceeds the threshold potential $V_{thD2}$, the lower MOSFET 17 enters the ON state. In this example, the potential D2 at the gate terminal exceeds the threshold potential $V_{thD2}$ from time $t8_{on}$ to time $t8_{off}$. In this case, the lower MOSFET 17 is in the ON state from time $t8_{on}$ to time $t8_{off}$ as indicated by waveform V117.

The potential E2 at the gate terminal of the lower MOSFET 18 also varies, in a manner similar to that of the potential D2 at the gate terminal. That is, the potential E2 at the gate terminal varies in accordance with the change in the potential at the junction point P. Once the potential E2 at the gate terminal exceeds the threshold potential $V_{thE2}$, the lower MOSFET 18 enters the ON state. In this example, the potential E2 at the gate terminal exceeds the threshold potential $V_{thE2}$ from time $t8_{on}$ to time $t8_{off}$. In this case, the lower MOSFET 18 is in the ON state from time $t8_{on}$ to time $t8_{off}$ as indicated by waveform W18.

That is, each of the lower MOSFETs 17 and 18 is in the ON state from time $t8_{on}$ to time $t8_{off}$. When both the braking MOSFETs have entered the ON state, an electromagnetic brake occurs in the motor portion 19, reducing the rotation rate of the fan.

In this fan apparatus 100, the Zener voltage $V_{ZD1}$ of the constant voltage diode ZD1 and the resistance value of the resistor R1 are determined as follows. The power supply voltage V is higher in voltage than the control power supply voltage A. In this example, the power supply voltage V is 54 [V], and the control power supply voltage A is 12 [V]. The control power supply voltage A is applied to the junction point P through the diode 21. Here, while the power supply voltage V is being supplied to the fan apparatus 100, the voltage is applied to the junction point P through the diode D1 and the resistor R1 of the back-electromotive force supply portion. The Zener voltage $V_{ZD1}$ of the constant voltage diode ZD1 is determined on the basis of permissible values of the voltage applied to the junction point P while the power supply voltage V is being supplied. Specifically, the Zener voltage $V_{ZD1}$ is determined on the basis of the control power supply voltage A. For example, when the control power supply voltage A is 12 [V], the Zener voltage $V_{ZD1}$ of the constant voltage diode ZD1 is 12 [V]. That is, a breakdown voltage of the constant voltage diode ZD1 is determined on the basis of the control power supply voltage A used for control and generated from the power supply voltage V.

The Zener voltage $V_{ZD1}$ of the constant voltage diode ZD1 is lower than the power supply voltage V. Therefore, while the power supply voltage V is being supplied, an electric current iz flows from the power supply voltage V to the ground potential GND through the diode D1 and the resistor R1 of the back-electromotive force supply portion and the constant voltage diode ZD1. This electric current iz does not contribute to the driving of the motor portion 19. A reduction in power consumption of the fan apparatus 100 can be achieved by reducing the electric current iz. The electric current iz is given by (power supply voltage V−Zener voltage $V_{ZD1}$)/(resistance value of resistor R1). Accordingly, in the fan apparatus 100, a reduction in the electric current iz can be achieved by a relatively large resistance value of the resistor R1. The resistance value of the resistor R1 is, for example, 47 [kΩ)].

Figure 6:
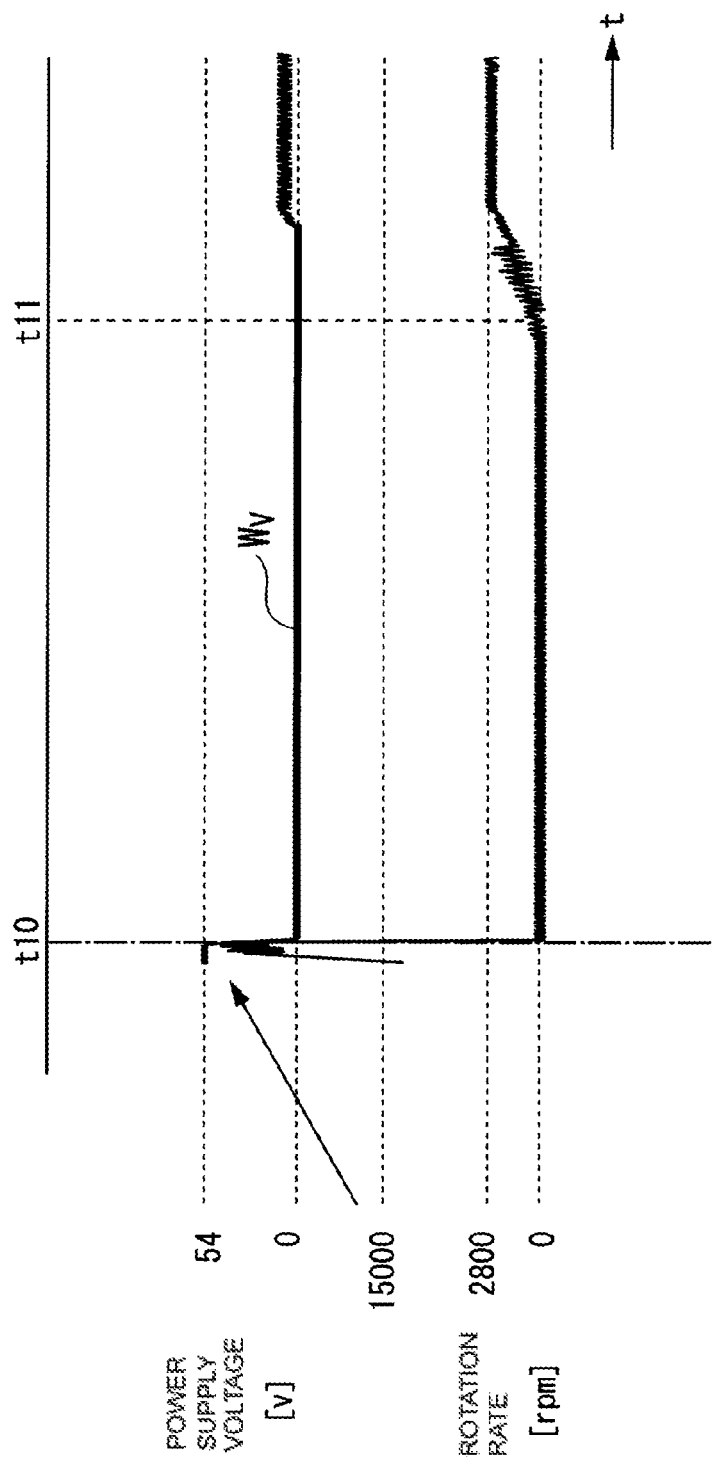
FIG. 6 shows a graph representing an example of the rotation rate of a motor portion in the case where a brake is not applied after the interruption of the power supply.
Figure 7:
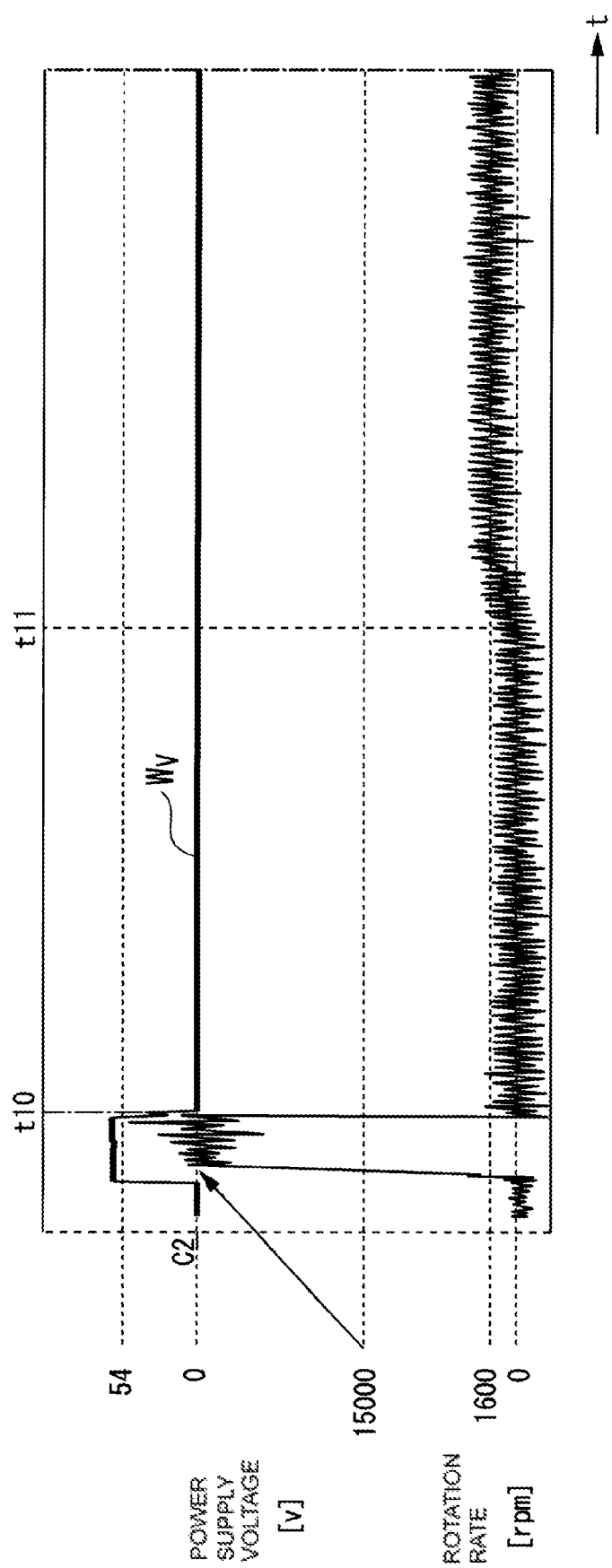
FIG. 7 shows a graph representing an example of the rotation rate of the motor portion in the case where a brake is applied after the interruption of the power supply.

A result of a test on braking after the interruption of the power supply will now be described below with reference to FIGS. 6 and 7. FIG. 6 shows a graph representing an example of the rotation rate of the motor portion 19 in the case where a brake is not applied after the interruption of the power supply. FIG. 7 shows a graph representing an example of the rotation rate of the motor portion 19 in the case where a brake is applied after the interruption of the power supply.

In this test, the supply of the power supply voltage V is interrupted at time t10, and thereafter, the motor portion 19 is caused to rotate by an external force at time t11. Specifically, a wind is applied to the fan of the fan apparatus 100 at time t11 to cause the fan to rotate by wind power. In the case where a brake is not applied after the interruption of the power supply, the rotation rate of the motor portion 19 is increased to 2800 [rpm] (46.7 [r/s]) after time t11 as illustrated in FIG. 6.

Meanwhile, in the case where a brake is applied after the interruption of the power supply, the rotation rate of the motor portion 19 is increased to 1600 [rpm] (26.7 [r/s]) after time t11 as illustrated in FIG. 7. That is, in the fan apparatus 100, the brake applied after the interruption of the power supply reduces the rotation rate of the motor portion 19 by 1400 [rpm] (23.3 [r/s]).

As described above, the fan apparatus 100 is able to reduce the rotation rate of the motor caused by an external force without the need for power supplied from an external source. That is, the fan apparatus 100 is able to achieve a reduced power consumption, and is also able to reduce the rotation rate of the motor caused by an external force.

In addition, the fan apparatus 100 applies a brake at the interruption of the power supply, in addition to the brake after the interruption of the power supply. Also with the brake at the interruption of the power supply, the fan apparatus 100 reduces the rotation rate of the motor caused by an external force without the need for power supplied from an external source. That is, the fan apparatus 100 is able to achieve a reduced power consumption, and is also able to reduce the rotation rate of the motor caused by an external force.

Note that, although each of the upper MOSFETs 15 and 16 is a non-braking MOSFET, and each of the lower MOSFETs 17 and 18 is a braking MOSFET in the exemplary embodiment described above, this is not essential to the present disclosure. Each of the upper MOSFETs 15 and 16 and each of the lower MOSFETs 17 and 18 may alternatively be a braking MOSFET and a non-braking MOSFET, respectively.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A fan apparatus having a drive circuit for an electrically-driven rotor, the fan apparatus comprising:
   a drive signal generating circuit portion for the electrically-driven rotor;
   an output stage including an upper MOSFET and a lower MOSFET; and
   a motor portion to be driven by the output stage; wherein
   one of the upper MOSFET and the lower MOSFET is a braking MOSFET, while another of the upper MOSFET and the lower MOSFET is a non-braking MOSFET; and
   the fan apparatus further comprises:
   a back-electromotive force supply portion arranged to supply, to the braking MOSFET, power by a back-electromotive force caused by rotation of the motor portion while a power supply voltage for the electrically-driven rotor is not being supplied;

an electromagnetic brake portion arranged to electromagnetically brake the motor portion by causing the braking MOSFET to enter an ON state through the power supplied by the back-electromotive force supply portion;

the fan apparatus further comprises:
   a power supply voltage monitoring circuit portion arranged to detect whether the power supply voltage is being supplied;
   a control power supply voltage generation portion arranged to generate a control power supply voltage from the power supply voltage;
   a diode arranged between a power output terminal of the control power supply voltage generation portion and a gate terminal of the braking MOSFET, and having an anode connected to the power output terminal and a cathode connected to the gate terminal; and
   the drive circuit arranged to receive supply of the control power supply voltage and a drive signal outputted from the drive signal generating circuit portion, and arranged to drive the gate terminal of the braking MOSFET;

the drive signal generating circuit portion is arranged to control the non-braking MOSFET to enter an OFF state when the power supply voltage monitoring circuit portion has detected an interruption of supply of the power supply voltage; and the back-electromotive force supply portion includes:
   a parasitic diode in the non-braking MOSFET;
   a series circuit including a resistor and a back-electromotive force supply diode having one end connected to a cathode of the parasitic diode and another end connected to a ground side of the power supply voltage; and
   a supply line arranged to supply, to the gate terminal of the braking MOSFET, power supplied to the series circuit through the parasitic diode.

2. The fan apparatus according to claim 1, wherein the back-electromotive force supply portion further includes a constant voltage diode connected between the ground side of the power supply voltage and a point of junction of the series circuit and the supply line.

3. The fan apparatus according to claim 2, wherein a breakdown voltage of the constant voltage diode is determined on a basis of the control power supply voltage generated from the power supply voltage.

4. A fan apparatus having a drive circuit for an electrically-driven rotor, the fan apparatus comprising:
   a drive signal generating circuit portion for the electrically-driven rotor;
   an output stage including an upper MOSFET and a lower MOSFET; and
   a motor portion to be driven by the output stage; wherein
   one of the upper MOSFET and the lower MOSFET is a braking MOSFET, while another of the upper MOSFET and the lower MOSFET is a non-braking MOSFET; and the fan apparatus further comprises:
   a back-electromotive force supply portion arranged to supply, to the braking MOSFET, power by a back-electromotive force caused by rotation of the motor portion while a power supply voltage for the electrically-driven rotor is not being supplied;
   an electromagnetic brake portion arranged to electromagnetically brake the motor portion by causing the braking MOSFET to enter an ON state through the power supplied by the back-electromotive force supply portion; and the back-electromotive force supply portion includes:
   a parasitic diode in the non-braking MOSFET;
   a series circuit including a resistor and a back-electromotive force supply diode having one end connected to a cathode of the parasitic diode and another end connected to a ground side of the power supply voltage; and
   a supply line arranged to supply, to the gate terminal of the braking MOSFET, power supplied to the series circuit through the parasitic diode.

\* \* \* \* \*